(12) United States Patent
Acker et al.

(10) Patent No.: US 9,021,424 B2
(45) Date of Patent: *Apr. 28, 2015

(54) MULTI-DOCUMENT EDITOR WITH CODE INLINING

(75) Inventors: Michael Acker, Grossfischlingen (DE); Juergen Remmel, Muehlhausen (DE); Hans-Christian Weber, Dresden (DE)

(73) Assignee: SAP SE, Walldorf (DE)

( * ) Notice: Subject to any disclaimer, the term of this patent is extended or adjusted under 35 U.S.C. 154(b) by 2275 days.

This patent is subject to a terminal disclaimer.

(21) Appl. No.: 11/237,995

(22) Filed: Sep. 27, 2005

(65) Prior Publication Data

US 2007/0074127 A1   Mar. 29, 2007

(51) Int. Cl.
*G06F 9/44* (2006.01)
*G06F 17/30* (2006.01)

(52) U.S. Cl.
CPC . *G06F 17/30* (2013.01); *G06F 8/33* (2013.01)

(58) Field of Classification Search
USPC .......... 717/101–106, 113; 707/1, 103 R, 203; 715/714, 751, 235, 719, 205; 709/205; 345/666

IPC .......................................... G06F 17/3089,17/30
See application file for complete search history.

(56) References Cited

U.S. PATENT DOCUMENTS

| | | | | |
|---|---|---|---|---|
| 5,574,898 A * | 11/1996 | Leblang et al. | .................... | 707/1 |
| 5,596,700 A * | 1/1997 | Darnell et al. | ................ | 715/205 |
| 5,630,040 A * | 5/1997 | Furuya | ........................... | 345/666 |
| 6,112,201 A * | 8/2000 | Wical | ................. | 707/5 |
| 6,275,223 B1 * | 8/2001 | Hughes | ........................ | 715/751 |
| 6,574,635 B2 * | 6/2003 | Stauber et al. | ................ | 707/704 |
| 6,826,727 B1 * | 11/2004 | Mohr et al. | ................... | 715/235 |
| 7,051,316 B2 * | 5/2006 | Charisius et al. | ............. | 717/103 |
| 7,124,366 B2 * | 10/2006 | Foreman et al. | ............. | 715/719 |
| 7,272,815 B1 * | 9/2007 | Eldridge et al. | ............. | 717/101 |
| 7,490,292 B2 * | 2/2009 | Hennum | ....................... | 715/714 |
| 2003/0046345 A1 * | 3/2003 | Wada et al. | .................... | 709/205 |
| 2004/0186817 A1 * | 9/2004 | Thames et al. | .................... | 707/1 |

* cited by examiner

*Primary Examiner* — Tuan Vu
(74) *Attorney, Agent, or Firm* — Fish & Richardson P.C.

(57) ABSTRACT

A multi-document editor system includes a repository for storing a plurality of documents having code fragments. The system further includes a graphical user interface having an editor window within a display region, the editor window for displaying a rendering of the plurality of documents. A program editor module provides a unified editor control to the editor window for editing the plurality of documents.

18 Claims, 3 Drawing Sheets

MULTI-DOCUMENT EDITOR WITH CODE INLINING

BACKGROUND

Business application programs are typically written and compiled according to a business application programming language such as the Advanced Business Application Programming (ABAP) language developed by SAP AG (Walldorf, Germany). Some programming languages feature mechanisms to support enhancement of a standard business coding in order to integrate industry-specific or customer-specific code fragments. This mechanism—known as the Enhancement and Switch Framework—is used to retrofit industry-specific enhancements into the standard coding structure, and to activate or deactivate those enhancements dynamically to achieve industry-specific behavior of the business applications. Enhancements, or extensions of the coding structure, are stored separately from the original code structure document.

As a specific example, within the ABAP switch framework, the ABAP enhancements are in the form of switchable code fragments that can be added to existing ABAP code at certain positions in the coding structure. Additionally, these enhancements can be switched on or off by setting separately stored switches. Depending on the switch setting, the corresponding enhancements are pre-processed by the ABAP compiler at compile-time and evaluated at run-time to decide whether or not the enhancement is to be executed. Accordingly, the switch settings serve to configure an application program dynamically.

The switchable code fragments may be written in a variety of programming languages. For proper integration into the switch framework, the code fragments need to be edited together in a standard language environment, which means that a code author needs to have knowledge of the standard code language. Otherwise, the switch framework integrator needs to have knowledge of the code languages of all of the code fragments.

Conventional application development platforms use multi-document editors with a user interface that provides separate editor controls for each different code fragment. These controls are often placed on separate tab strips, or in separate windows of the user interface. Accordingly, editing and integration of the different code fragments within the code framework is very difficult and burdensome.

SUMMARY

This document describes a multi-document editor system and method.

In one aspect, a multi-document editor system includes a repository storing a plurality of documents having code fragments, and a graphical user interface having an editor window within a display region. The editor window displays a rendering of the plurality of documents. The system further includes a program editor module that provides a unified editor control to the editor window for editing the plurality of documents.

In another aspect, a method for editing a plurality of documents includes combining the plurality of documents in a unified editable window of a graphical user interface, and designating at least some of the plurality of the documents as subdocuments. A method further includes arranging the subdocuments within a parent document in the window according to an order.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
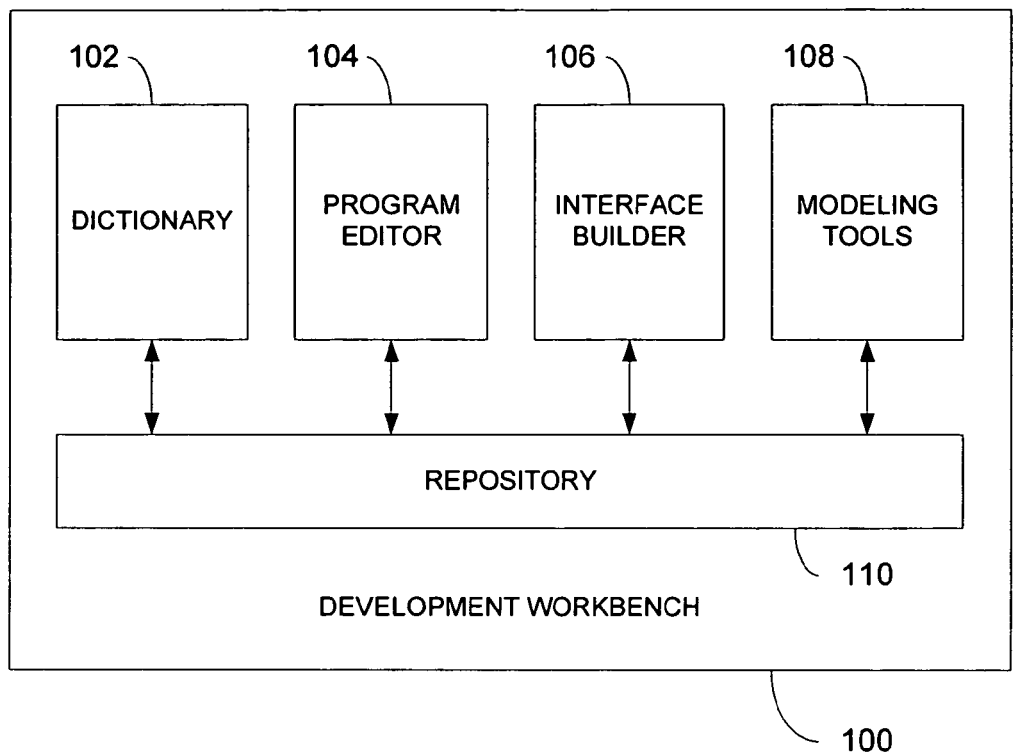
FIG. 1 is a block diagram of a development workbench for one or more business applications.

FIG. 1 is a functional block diagram of a development workbench 100 for one or more business applications. The development workbench 100 includes a dictionary module 102, a program editor module 104, an interface builder module 106, and a set of modeling tools 108. Each of the modules and tools access resources from a repository 110, which stores and provides access to documents and documentation, dictionary data, screen descriptions, help texts and other application program development objects.

Application development metadata, such as the definition of tables and data structures, is created, managed and incorporated into the dictionary module 102. The program editor module 104 provides editing functions for business applications, including editing functions for documents used by the various business applications. In an exemplary embodiment, the program editor module 104 supports multiple documents in one editor control displayed in a user interface.

The interface builder module 106 automatically generates an interface for a business application created with the program editor module 104, so that a user does not have to worry about system-specific interfaces or system-related communications protocols for any particular client/server environment. The modeling tools 108 provide a set of tools to model the runtime and customization of the business applications or any documents they use. Business applications created with the development workbench 100 can run on many types of computers, database management systems, and graphical user interfaces, without local customization. Accordingly, these business applications can run in both centralized and distributed client/server configurations.

Figure 2:
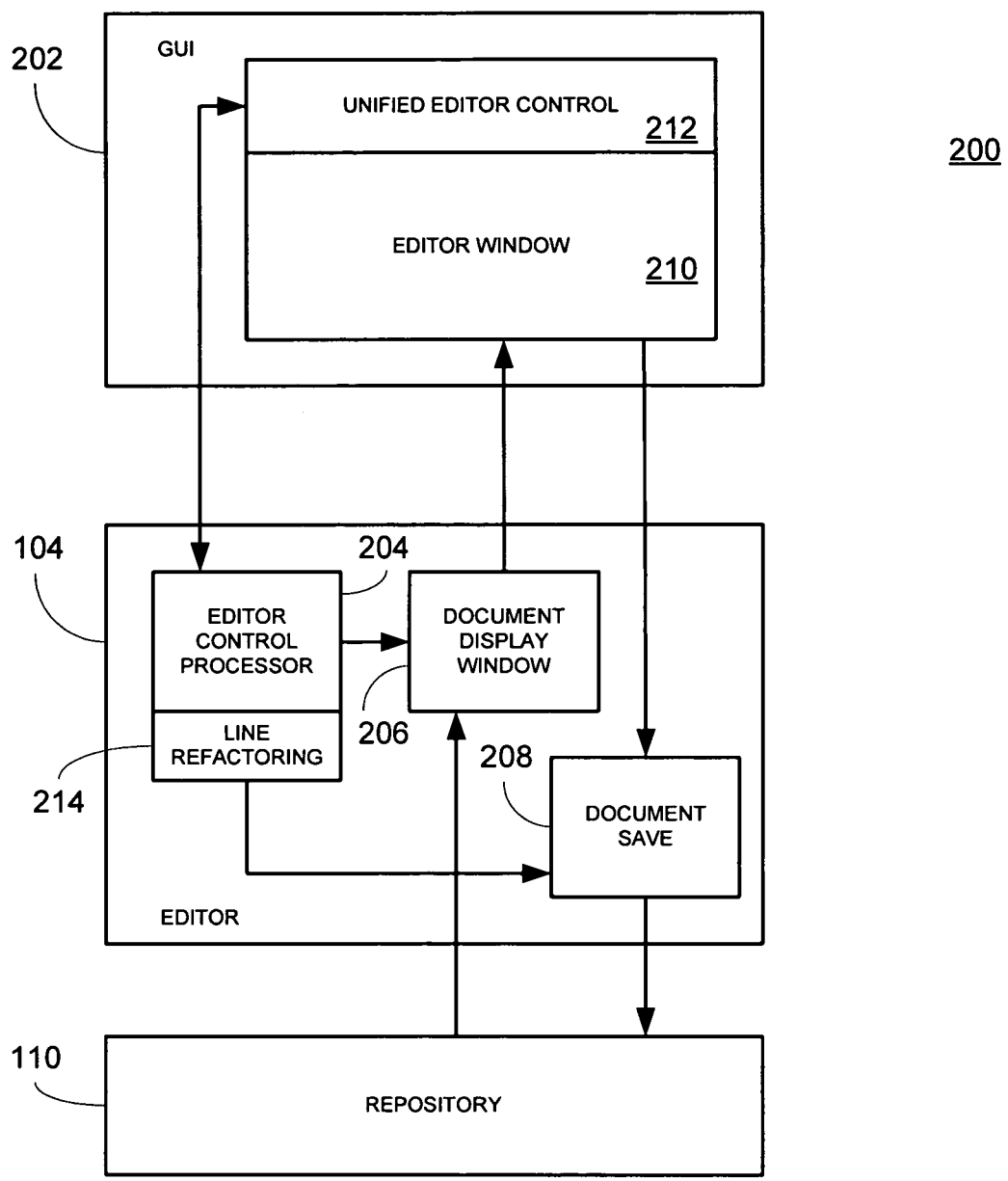
FIG. 2 is a block diagram of a multi-document editor system.

FIG. 2 is a functional block diagram of a multi-document editor system 200. The multi-document editor system 200 includes the program editor module 104 that accesses and stores documents and other data from and to the repository 110. The program editor module 104 generates and provides information for display in a graphical user interface 202. The graphical user interface 202 can include on or more "windows" of display information, where related information is contained within a defined region of the display area of the graphical user interface 202.

The multi-document editor system 200 supports multiple documents in a unified control interface in the graphical user interface 202. The graphical user interface 202 includes an editor window 210 that is generated by a document display window generator 206 of the program editor module 104. The editor window 210 displays one or more documents in a window of the graphical user interface 202. The editor window 210 can be a portion of the graphical user interface 202 and defined by a graphical "frame" or other graphically delineating mechanism.

The editor window 210 includes, or is otherwise associated with, a unified editor control 212. The unified editor control 212 can be displayed as a tabular bar above or at the periphery of the editor window 210, or as a pull-down menu or control bar at the periphery of the graphical user interface 202. The unified editor control 212 is generated by, and operates under the control of logic of, an editor control processor 204 of the program editor module 104. In some embodiments, the editor control processor 204 is a submodule of the program editor module 104.

User inputs received by the unified editor control 212, such as by a "click" or selection by a mouse or other cursor-control or signal input device, are received and executed by the editor control processor 204. Edits to any documents displayed in the editor window 210 are saved to the repository 110 by a document save module 208 of the program editor 104. The document save module 208 can be controlled by user inputs received and processed by the editor control processor 204.

The program editor module 104, in combination with the graphical user interface 202 and editor window 210, provides several unique functionalities for documents related to business applications. In a default mode, documents displayed in the editor window 210 are surrounded by comment lines, which are not editable by the user. The unified editor control 212 includes a control function for disabling the comment lines, so that the document or lines of the document cannot be edited. This control function can disable any line of the document, such as special comment lines and enhancements that are currently locked.

The program editor module 104 can designate documents as logical subdocuments of other documents (i.e. parent documents). The program editor module 104 places the logical subdocuments in the parent document at a particular position. Accordingly, the program editor module 104 can be used to create a master parent document from a number of subdocuments, each of which are placed for execution in a particular order. Some of the subdocuments may be not editable for some reason (e.g. locked by another user, or no permission given). In this case, the program editor module 104 will set all lines of that document to "not editable" as well.

The editor control processor 204 can enable collapsing and/or expansion of any of the documents being displayed in the editor window 210. Each document from the repository 110 has its own original line numbering. To unify the line numbering of a number of documents, the editor control processor 204 of the program editor module 104 provides a line refactoring process 214, in which the editor module 104 can search, replace, and renumber lines of a subdocument according to its position within a parent document. The line refactoring process 214 can be part of the editor control processor 204 or a separate module within the editor module 104.

The line refactoring process 214 is also configured to set break-points in a parent document in relation to the specific source or subdocument. Navigation (e.g. from an error message) is performed on the parent document based on active/inactive handling (i.e. some documents or subdocuments may be inactive, others not. The functions Save and Activation of individual documents are also provided by the line refactoring process 214.

Figure 3:
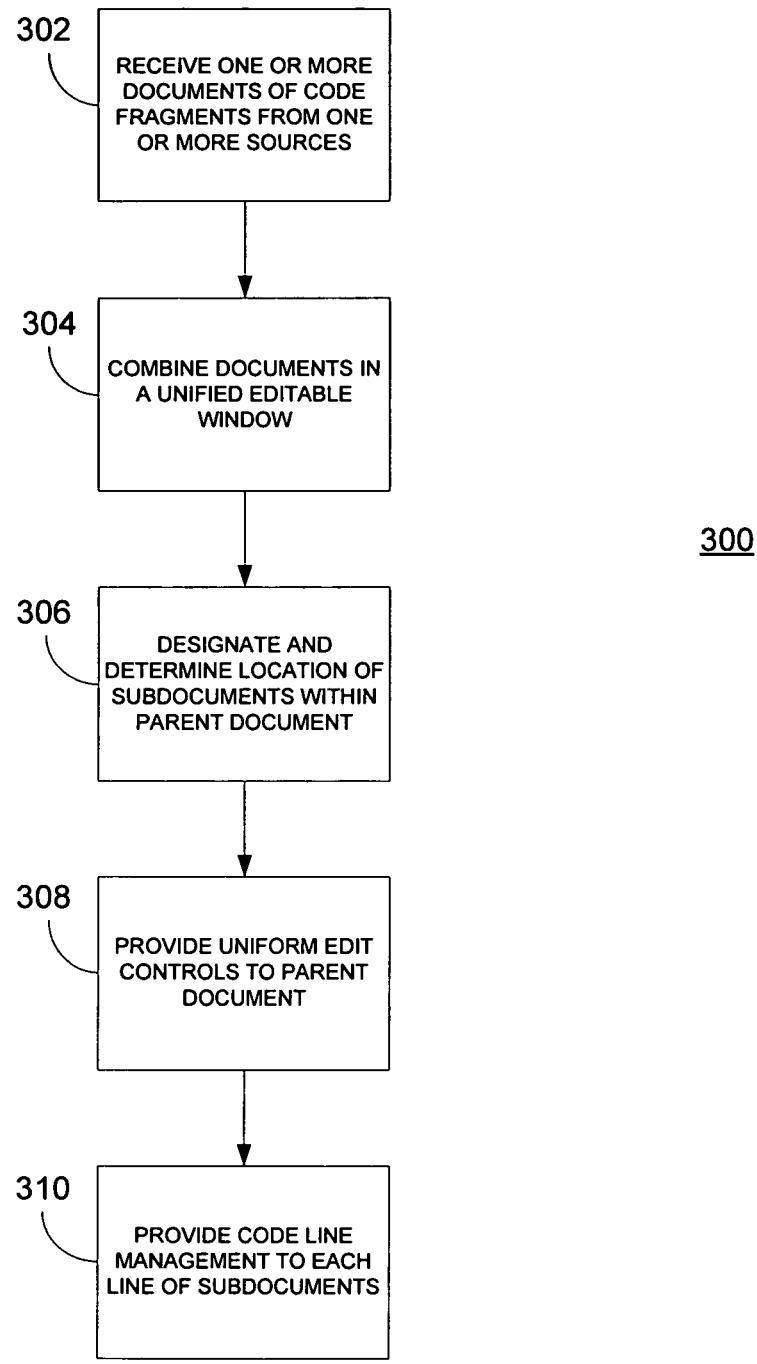
FIG. 3 is a flowchart of a method for supporting multiple documents in a unified editor control in a user interface.

FIG. 3 is a flowchart of a method 300 for supporting multiple documents in a unified editor control in a user interface. At 302, one or more documents are received from one or more sources. Each source can be a proprietary computer system in a distributed, heterogeneous network. Each document can include a number of lines of code that represents a code fragment that can be switched in and out during runtime by a switch framework. At 304, the received documents are combined in a unified editable window. The documents are displayed in a single window of a user interface for a multi-document editor.

At 306, each document is designated as a subdocument of a parent document, and a location within the parent document is determined for each subdocument. At 308, a unified editor control is provided for the parent document and associated subdocuments, so that each document may be edited in a single window in the user interface. The editor control includes functions to collapse and/or expand any subdocument within the parent document, search and replace, refactoring of code lines and line numbering, break point setting, activating/deactivating subdocuments or code lines thereof, and saving portions of the parent document, including saving the parent document as a whole. Many of the functions are based on a line number, and therefore at 310 code line management is provided to each line of each of the subdocuments in the parent document.

The program editor 104 and its various enhancements are not limited to use with the hardware and software described above; they may find applicability in any computing or processing environment and with any type of machine that is capable of running machine-readable instructions. All or part of the program editor 104 can be implemented in digital electronic circuitry, or in computer hardware, firmware, software, or in combinations thereof.

All or part of the program editor 104 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the program editor 104 can be performed by one or more programmable processors executing one or more computer programs to perform the functions of the program editor 104. The method steps can also be performed by, and process 40 can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data.

Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the program editor 104 can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the program editor 104, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with the program editor 104 can be rearranged and/or one or more such steps can be omitted to achieve the same, or similar, results to those described herein. The program editor 104 may be fully automated, meaning that it operate without user intervention, or interactive, meaning that all or part of the program editor 104 may include some user intervention.

In addition to storing log files generated by applications, the program editor 104 may also store log files generated by a wrapper service. A wrapper service is software that accompanies resources or other software for the purposes of improving convenience, compatibility, or security. These log files may be stored in the same manner as described above.

Elements of different embodiments described herein may be combined to form other embodiments not specifically set forth above. Other embodiments not specifically described herein are also within the scope of the following claims.

The invention claimed is:

1. A multi-document editor system comprising:
a repository storing a plurality of documents having code fragments, the code fragments comprising switchable code fragments that can be switched in and out during runtime by a switch framework;
a graphical user interface having a single editor window within a display region, the single editor window for concurrently displaying a rendering of the plurality of documents, at least some of the plurality of documents being sub-documents of a parent document, the single editor window also displaying comment lines surrounding respective documents of the plurality of documents, the comment lines being non-editable;
a program editor module that provides a unified editor control to the editor window for editing each of the plurality of documents in the single editor window, the unified editor control providing a control function for disabling the comment lines, the program editor module executing a line refactoring process to set break-points in the parent document in relation to specific sub-documents; and
an interface builder module that automatically generates an interface for a business application that is created using the program editor module, the business application using the plurality of documents and being generated such that the business application can be run without local customization and can run in both centralized and distributed client/server configurations.

2. A system in accordance with claim 1, wherein the program editor module includes a document display window generator for generating the rendering of the plurality of documents.

3. A system in accordance with claim 1, wherein the program editor module includes an editor control processor for generating the unified editor control.

4. A system in accordance with claim 3, wherein the unified editor control includes a control bar.

5. A system in accordance with claim 4, wherein the editor control processor generates the control bar for display in the display region proximate the editor window.

6. A system in accordance with claim 1, wherein the program editor module includes a line refactoring module for managing each line of code in the code fragments of each of the plurality of documents.

7. A system in accordance with claim 1, wherein the program editor module executes the line refactoring process to search, replace and renumber lines of a sub-document based on the sub-document's position within the parent document.

8. A method for editing a plurality of documents, the method comprising:
combining the plurality of documents in a unified editable window of a graphical user interface, each document having code fragments comprising switchable code fragments that can be switched in and out during runtime by a switch framework;
concurrently displaying a rendering of each of the plurality of documents in a single editor window within a display region, at least some of the plurality of the documents being sub-documents of a parent document, and also displaying comment lines surrounding respective documents of the plurality of documents, the comment lines being non-editable;
editing each of the plurality of documents in the single editor window using a unified editor control, the unified editor control providing a control function for disabling the comment lines;
executing a line refactoring process to set break-points in the parent document in relation to specific sub-documents; and
automatically generating an interface for a business application that is created based on the editing, the business application using the plurality of documents and being generated such that the business application can be run without local customization and can run in both centralized and distributed client/server configurations.

9. A method in accordance with claim 8, further comprising receiving the plurality of documents from one or more sources.

10. A method in accordance with claim 8, further comprising providing a unified set of edit controls for the plurality of documents.

11. A method in accordance with claim 10, further comprising displaying the unified set of edit controls in the graphical user interface proximate the single editor window.

12. A method in accordance with claim 8, further comprising managing the plurality of documents in the unified editable window according to a set of line numbers for the plurality of documents.

13. A method in accordance with claim 8, further comprising storing the plurality of documents in a repository.

14. A computer program product, tangibly embodied in a non-transitory machine readable medium, comprising instructions operable to:
combine the plurality of documents in a unified editable window of a graphical user interface, each document having code fragments comprising switchable code fragments that can be switched in and out during runtime by a switch framework;

concurrently displaying a rendering of each of the plurality of documents in a single editor window within a display region, at least some of the plurality of the documents being sub-documents of a parent document, and also displaying comment lines surrounding respective documents of the plurality of documents, the comment lines being non-editable;

editing each of the plurality of documents in the single editor window using a unified editor control, the unified editor control providing a control function for disabling the comment lines;

executing a line refactoring process to set break-points in the parent document in relation to specific sub-documents; and automatically generating an interface for business application that is created based on the editing, the business application using the plurality of documents and being generated such that the business application can be run without local customization and can run in both centralized and distributed client/server configurations.

15. A computer program product in accordance with claim 14 further comprising code to receive the plurality of documents from one or more sources.

16. A computer program product in accordance with claim 14 further comprising code to provide a unified set of edit controls for the plurality of documents.

17. A computer program product in accordance with claim 14 further comprising code to display the unified set of edit controls in the graphical user interface proximate the unified editable window.

18. A computer program product in accordance with claim 14 further comprising code to manage the plurality of documents in the unified editable window according to a set of line numbers for the plurality of documents.

* * * * *